United States Patent
Ishikawa

Patent Number: 5,282,398
Date of Patent: Feb. 1, 1994

[54] WAVE GEAR DRIVE

[75] Inventor: Shoich Ishikawa, Yokohama, Japan

[73] Assignee: Harmonic Drive Systems, Inc., Kanagawa, Japan

[21] Appl. No.: 841,996

[22] Filed: Feb. 28, 1992

[30] Foreign Application Priority Data

Mar. 1, 1991 [JP] Japan .................................. 3-35819

[51] Int. Cl.$^5$ ...................... F16H 33/00; F16H 55/06
[52] U.S. Cl. .................................................. 74/640
[58] Field of Search ......................................... 74/640

[56] References Cited

U.S. PATENT DOCUMENTS

| | | | |
|---|---|---|---|
| 2,906,143 | 9/1959 | Musser | 74/640 |
| 2,930,254 | 3/1960 | Musser et al. | 74/640 |
| 2,931,248 | 4/1960 | Musser | 74/640 |
| 2,959,065 | 11/1960 | Musser | 74/640 |
| 3,005,358 | 10/1961 | Musser | 74/640 |
| 3,034,375 | 5/1962 | Musser | 74/640 |
| 3,667,320 | 6/1972 | Robinson | 74/640 |
| 4,823,638 | 4/1989 | Ishikawa | 74/640 |
| 4,974,470 | 12/1990 | Ishikawa et al. | 74/640 |

FOREIGN PATENT DOCUMENTS

| | | | |
|---|---|---|---|
| 1-79448 | 3/1989 | Japan | 74/640 |
| 2-283940 | 11/1990 | Japan | 74/640 |
| 282866 | 10/1971 | U.S.S.R. | 74/640 |
| 316882 | 12/1971 | U.S.S.R. | 74/640 |
| 1527434 | 12/1989 | U.S.S.R. | 74/640 |

Primary Examiner—Rodney H. Bonck
Assistant Examiner—Ryan W. Massey
Attorney, Agent, or Firm—Burns, Doane, Swecker & Mathis

[57] ABSTRACT

A wave gear drive having a wave generator whose exterior configuration is formed using a shape defined by a tangential polar coordinate equation having at least four Fourier expansion terms, whereby the amount of flexing of the flexible external gear can be maintained at a prescribed magnitude while simultaneously reducing the magnitude of the tooth rim bending stress of the external gear, and the meshing entry gap of the teeth can be enlarged, thus eliminating the danger of tooth interference. The wave gear drive exhibits high load capacity and excellent gear meshing performance.

1 Claim, 6 Drawing Sheets

WAVE GEAR DRIVE

BACKGROUND OF THE INVENTION

1. Field of the Invention

This invention relates to a wave gear drive, and more particularly to the shape of a wave generator used in a wave gear drive.

2. Description of Related Art

A wave gear drive typically consists of a rigid circular internal gear, a flexible external gear which has 2n (n being a positive integer) less teeth than the internal gear and which is disposed inside the internal gear and flexed into an elliptical shape so as to mesh with the internal gear at two places, and a wave generator fitted inside the external gear for flexing it. Rotating the input shaft of the wave generator rotates the elliptical shape of the external gear and causes the external gear and the internal gear to rotate relative to each other in proportion to the difference in the number of their teeth. If one of the gears is fixed and the other is connected with an output shaft, the output shaft will rotate at a greatly reduced speed relative to the input shaft. Because of this ability to produce a large reduction ratio with only a small number of machine elements, wave gear drives are widely applied in precision machines and the like.

Although the basic tooth profile for the gears of a wave gear drive is linear (see U.S. Pat. No. 2,906,143), wave gear drives using other profiles have also been developed. For example, Japanese Patent Publication Sho 45-41171 discloses one using involute gears. In addition, for increasing load capacity the present inventor in Japanese Patent Public Disclosure Sho 63-115943 proposed a system using as the basis for the tooth face profile the curve obtained by similarity transforming the locus of motion, at a reduction ratio of ½, over a prescribed range from the meshing limit point on the locus of motion based on the rack approximation of the tooth of the external gear relative to the internal gear determined by the shape of the wave generator. Moreover, in Japanese Patent Public Disclosure Sho 64-79448 the inventor proposed a system for expanding the meshing range by applying the foregoing system to a negative-deviation wave gear drive. The two wave gear drives proposed by the inventor referred to above both employ a system in which the gear tooth profiles are continuously meshed.

The wave gear drives according to U.S. Pat. No. 2,906,143 and Japanese Patent Publication Sho 45-41171 have a drawback in that the gears cannot be continuously meshed. On the other hand, while the gears of the wave gear drives according to Japanese Patent Public Disclosure Sho 63-115943 and Japanese Patent Public Disclosure Sho 64-79448 mesh continuously, no consideration is given either to the addendum interference arising at the beginning of meshing because of deformation under the load on the tooth face or to the amplitude of the tooth rim bending stress, which directly affects the strength of the flexible external gear. Thus none of the prior art wave gear drives actually achieves ideal meshing and all leave room for improvement in terms of the drive's load capacity.

The object of this invention is therefore to provide a wave gear drive which, owing to the improved shape of its wave generator, exhibits increased load capacity and achieves better meshing of the tooth profiles.

SUMMARY OF THE INVENTION

The invention achieves this object by providing a wave gear drive wherein the shape used for forming the exterior configuration of the wave generator is defined by a tangential polar coordinate equation having at least four Fourier expansion terms.

When the wave generator is shaped in this manner, the amount of flexing of the flexible external gear can be maintained at a prescribed magnitude while simultaneously reducing the magnitude of the tooth rim bending stress of the external gear and, moreover, the meshing entry gap of the teeth can be enlarged, thus eliminating the danger of tooth interference.

The above and other objects, characteristic features and advantages of the present invention will become more apparent to those skilled in the art as the disclosure of the present invention is made hereinbelow with reference to the accompanying drawings.

DETAILED DESCRIPTION OF THE PREFERRED EMBODIMENT

An embodiment of the present invention will now be described with reference to equations and the drawings.

Figure 1:
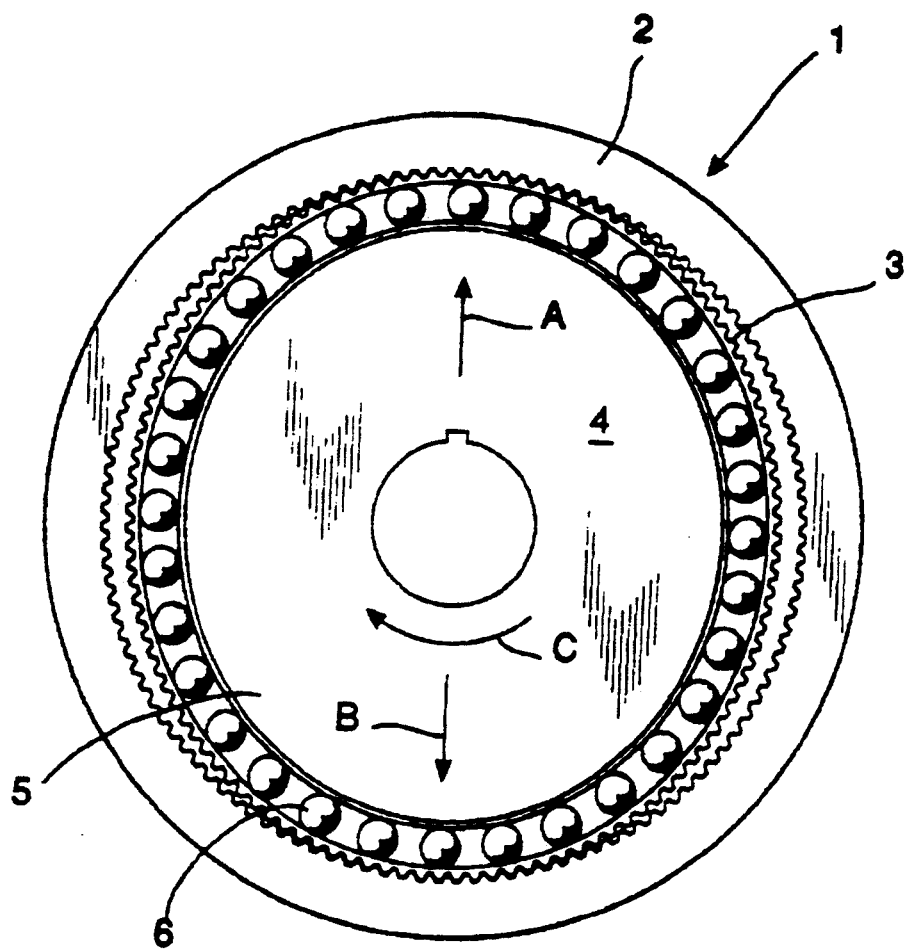
FIG. 1 is a front view of a typical wave gear drive.

FIG. 1 is a front view of a basic prior art wave gear drive. The wave gear drive 1 consists of a rigid circular internal gear 2, a flexible ring-shaped external gear 3 located inside the internal gear, and a wave generator 4 fitted inside the external gear for flexing the external gear into elliptical shape. The wave generator 4 consists of an inner elliptical cam plate 5, and a ball bearing 6 fitted on the periphery of the cam plate and flexed into an elliptical shape. The ball bearing is fitted inside the external gear 3. Since the external gear 3 is flexed into elliptical shape by the wave generator 4, it meshes with the rigid circular internal gear 2 only partially at two regions extending in either direction from two diametrically opposite points A and B. When the wave generator 4 is rotated, the elliptical shape of the external gear 3 also rotates. (The external gear 3 and the internal gear 2 differ in number of teeth by 2n, where n is a positive integer.)

Figure 2A:
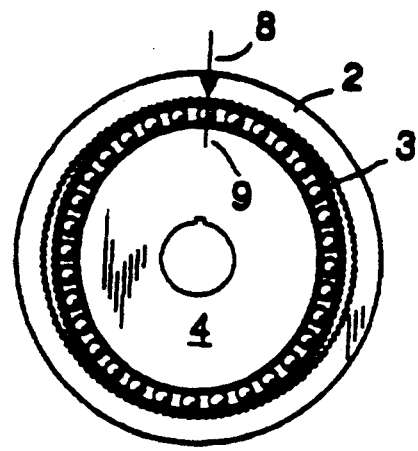
FIGS. 2(a)-2(d) are a series of front views of a typical wave gear device for explaining its operating principle.
Figure 2B:
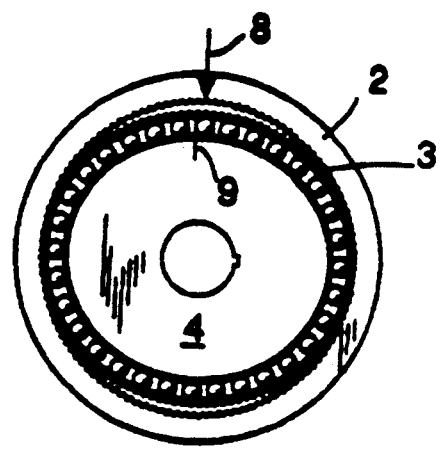
Figure 2C:
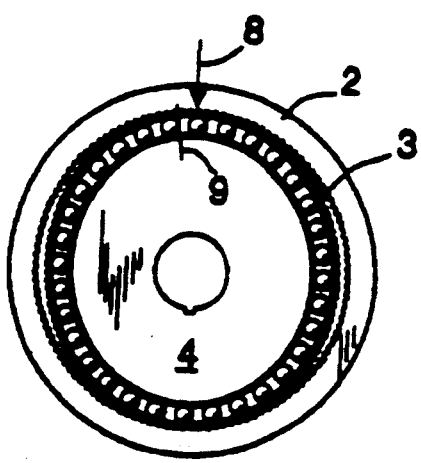
Figure 2D:
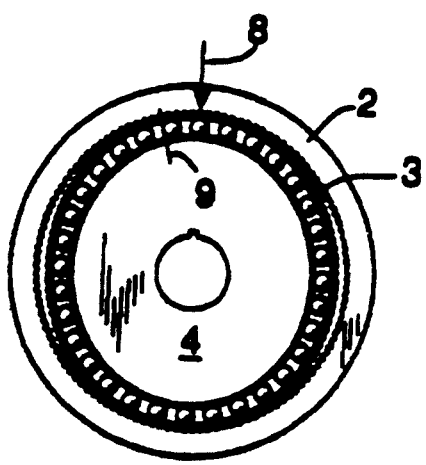

The operating principle of the wave gear drive 1 will now be explained with reference to FIG. 2. When the wave generator 4 is in the position shown in FIG. 2(a), a tooth space 8 of the internal gear 2 is meshed with a tooth 9 of the external gear 3 at one end of the major axis of the elliptical shape of the external gear 3. (A certain number of tooth spaces and teeth on either side of the tooth space 8 and tooth 9 are also meshed.) Rotating the wave generator 4 by 90° to the position shown in FIG. 2(b) causes the elliptical shape of the external gear 3 to rotate and the mesh point of the external gear 3 to shift in accordance with the movement of the major axis of the ellipse, whereby the tooth space 8 and the tooth 9 separate. When the wave generator 4 has been rotated by 180° as shown in FIG. 2(c), the tooth space 8 and the tooth 9 come into engagement with another tooth and another tooth space whose positions are offset by half the tooth number difference 2n from each other. When the wave generator 4 has been rotated b 360° as shown in FIG. 2(d), the offset between the tooth space 8 and the tooth 9 becomes equal to the tooth number difference 2n. Thus if rotation is input to the wave generator and the movement resulting from the successive shifting of the position of the mesh point is extracted as an output, there can be realized a large speed reduction relative to the rotation of the wave generator.

The basic tooth profile for the gears of a wave gear drive is linear, although there have also been developed wave gear drives using an involute gear profile or, for enhancing load capacity, using a profile which enables the teeth of the two gears to mesh continuously. In these, however, no consideration is given either to the addendum interference arising at the beginning of meshing because of deformation under the load on the tooth face or to the amplitude of the tooth rim bending stress that directly affects the strength of the flexible external gear. This invention therefore focuses on the shape of the wave generator. Specifically, by forming the wave generator in an appropriate shape, it eliminates the problem of addendum interference at the beginning of meshing and enhances the strength of the flexible external gear by reducing the amplitude of the tooth rim bending stress.

In this invention the elliptical curve of the wave generator is represented by a tangential polar coordinate equation. Strictly defined, this "elliptical curve" is the center line passing at one-half the thickness of the tooth rim portions of the flexible external gear. It is shown as denoted by reference numeral 10 in the x-y coordinate system of FIG. 3. Since the curve 10 is the shape used for the exterior configuration of the wave generator, it is referred to in this specification as the configuration curve.

Figure 3:
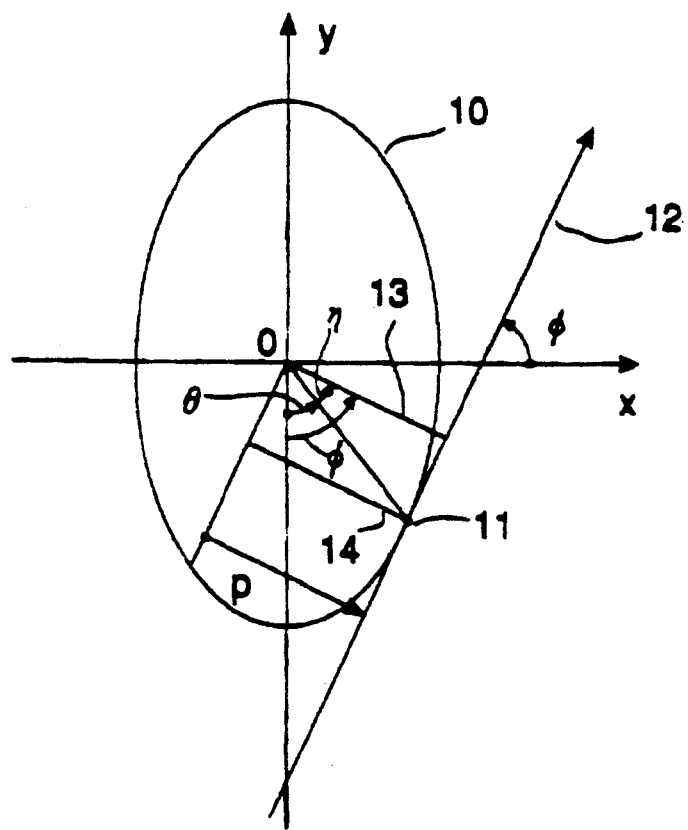
FIG. 3 is a graph for explaining the case where the configuration curve of a wave generator is represented by a tangential polar coordinate equation.

As used in this specification, the term "tangential polar coordinate equation" means an equation in which, as shown in FIG. 3, the angle of inclination $\phi$ of a tangent 12 to the configuration curve 10 drawn through a point 11 on the configuration curve 10 and the length p of a line 13 drawn from the origin of the x-y coordinate system perpendicular to the tangent are defined as coordinate variables and the configuration curve is represented as the relationship between these variables. As indicated by Eq. 1 below, in this invention the configuration curve is basically defined by a four-term Fourier expansion equation expressing the length p of the perpendicular 13 using the aforesaid tangential polar coordinate equation. (If necessary, it is of course possible for the Fourier expansion equation to have more than four terms.)

$$p = r_0 + a_1 \cos(2\phi) + a_2 \cos(4\phi) + a_3 \cos(6\phi) \quad 1)$$

where p is the length of the perpendicular 13, $\phi$ is the angle of the tangent 12 to the x axis, $r_0$ is the constant term of the Fourier expansion and is equal to the true circle radius of the external gear before it is deformed by the wave generator, $a_1$ is the coefficient of the first function term of the Fourier expansion, $a_2$ is the coefficient of the second function term of the Fourier expansion, and $a_3$ is the coefficient of the third function term of the Fourier expansion.

Next, defining the angle that the normal 14 makes with the radius vector r at the point 11 on the configuration curve 10 as $\eta$, we have $$\tan \eta = 2(a_1 \cdot \sin(2\phi) + 2 \cdot a_2 \cdot \sin(4\phi) + 3 \cdot a_3 \cdot \sin(6\phi)) \times \quad 2)$$
$$(r_0 + a_1 \cdot \cos(2\phi) + a_2 \cdot \cos(4\phi) + a_3 \cdot \cos(6\phi))^{-1}$$

From Eqs. 1 and 2, r (the radius vector of the configuration curve 10) and $\theta$ (the angle between the x axis and radius vector r) can be obtained as $$r = p \cdot \sec \eta \quad 3)$$

$$\theta = \phi - \eta \quad 4)$$

Moreover the radius of curvature $\rho$ of the configuration curve 10 at the point 11 can be obtained as $$\rho = r_0 - 3 \cdot a_1 \cos(2\phi) - 15 \cdot a_2 \cos(4\phi) - 35 \cdot a_3 \cos(6\phi) \quad 5)$$

Since the coefficients $a_1$, $a_2$ and $a_3$ are considerably smaller than $r_0$, the difference $\Delta k$ between the curvature $1/\rho$ at the point 11 and the curvature $1/r_0$ thereat before deformation can be obtained from this equation as $$\Delta k = (1/r_0)^2 \times (3 \cdot a_1 \cos(2\phi) + 15 \cdot a_2 \cos(4\phi) + 35 \cdot a_3 \cdot \cos(6\phi)) \quad 6)$$

Here the manner of selecting the coefficients $a_1$, $a_2$ and $a_3$ becomes important. In this invention they are determined to satisfy the conditions of the following Eqs. 7-11. First, defining the total amount of flexing of the external gear from true circular shape before deformation to an elliptical shape after deformation as 2e, we obtain $$a_1 + a_2 + a_3 = e \quad 7)$$

Then as the condition for $\Delta k$ to assume its extremum when $\phi = \beta$, we obtain $$a_1 \cdot \sin(2\beta) + 10 \cdot a_2 \cdot \sin(4\beta) + 35 \cdot a_3 \cdot \sin(6\beta) = 0$$

Defining the ratio between $\Delta k$ (extremum) when $\phi = \beta$ and $\Delta k$ when $\phi = 0$ as $\lambda (\lambda < 1)$, we have $$3 \cdot a_1 (\lambda - \cos(2\beta)) + 15 \cdot a_2 (\lambda - \cos(4\beta))$$
$$+ 35 \cdot a_3 (\lambda - \cos(6\beta)) = 0 \quad 9)$$

Next the conditions for reducing the amplitude of the tooth rim bending stress of the flexible external gear to below that in the case where the conventional elliptical curve is used will be derived. From the fact that for a given tooth rim thickness the tooth rim bending stress is proportional to $\Delta k$ and the fact that the radius vector of the conventional elliptical curve (harmonic curve) can be expressed as $$r = r_0 + (d/2) \cdot \cos(2\theta),$$

then from Eq. 8, it follows that $$3.a_1(1+\cos(2\beta))-15.a_2(1-\cos(4\beta))+35a_3(1+\cos(6\beta)) \leq 6e \quad \text{10)}$$

Further, the condition for ensuring a monotonous curvature in the vicinity of the minor axis of the configuration curve for forming the wave generator is $$a_1 - 20.a_2 + 105.a_3 > 0 \quad \text{11)}$$

Moreover, Eqs. 9, 10 and 11 also establish the conditions for approximating the configuration curve of the wave generator to the natural elastic curve obtained when flexing into an elliptical shape is produced by six forces operating at three places each in the vicinity of either end of the major axis of the elliptical curve (total of six places). An elastic curve produced by six forces is advantageous to one produced by four forces in that the deformation into an elliptical curve occurs more smoothly and that the amplitude of the tooth rim bending stress is smaller.

The procedures followed for using these equations to obtain $a_1$, $a_2$ and $a_3$ will now be explained. Appropriate values are selected for $\lambda$ and $\beta$ and Eqs. 7, 8 and 9 are solved simultaneously to obtain $a_1$, $a_2$ and $a_3$, whereafter a check is made to confirm whether the obtained values satisfy Eqs. 10 and 11. When the conditions of Eqs. 10 and 11 are not satisfied, the values of $\lambda$ and $\beta$ are changed and the computation is repeated. The following is an example of values obtained in this manner:

Where $r_0 = 35.5768$, $e = 0.54825$, $\lambda = 1.15$ and $\beta = 20.4°$, $a_1 = 0.57105$, $a_2 = -0.01529$ and $a_3 = -0.00751$.

Figure 4:
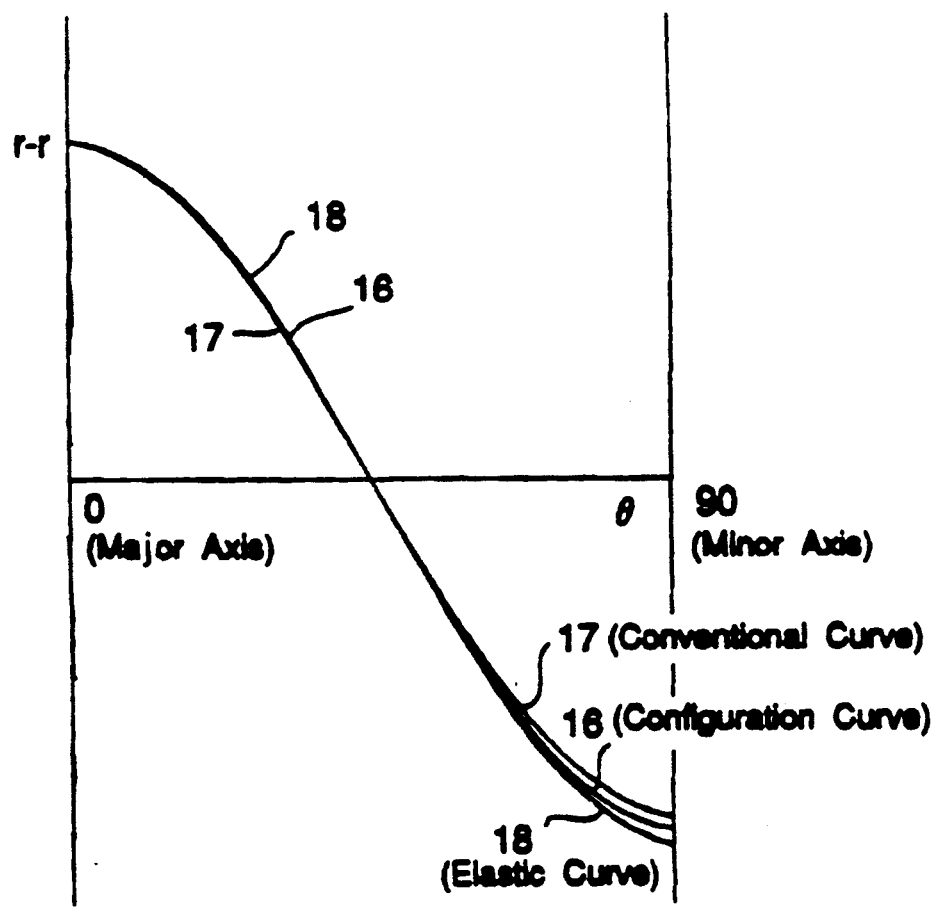
FIG. 4 is a graph showing the deviation of the configuration curve of the invention from true circular by comparison of the configuration curve of the invention with the conventional harmonic curve and an elastic curve produced by four sources.

Based on these values as one example, curve 16 in FIG. 4 was plotted to show the value of [r (radius vector) $-r_0$ (radius of true circle before deformation)] of the configuration curve of the wave generator according to this invention as a function of $\theta$. Also included in this figure for comparison is the corresponding curve 17 for the conventional elliptical curve (harmonic curve) and the corresponding curve 18 for an elastic curve produced by four forces (as a special case of the elastic curve produced by six forces). As is clear from this figure, the configuration curve according to this invention exhibits characteristics that are closer to the elastic curve than those of the conventional harmonic curve.

Figure 5:
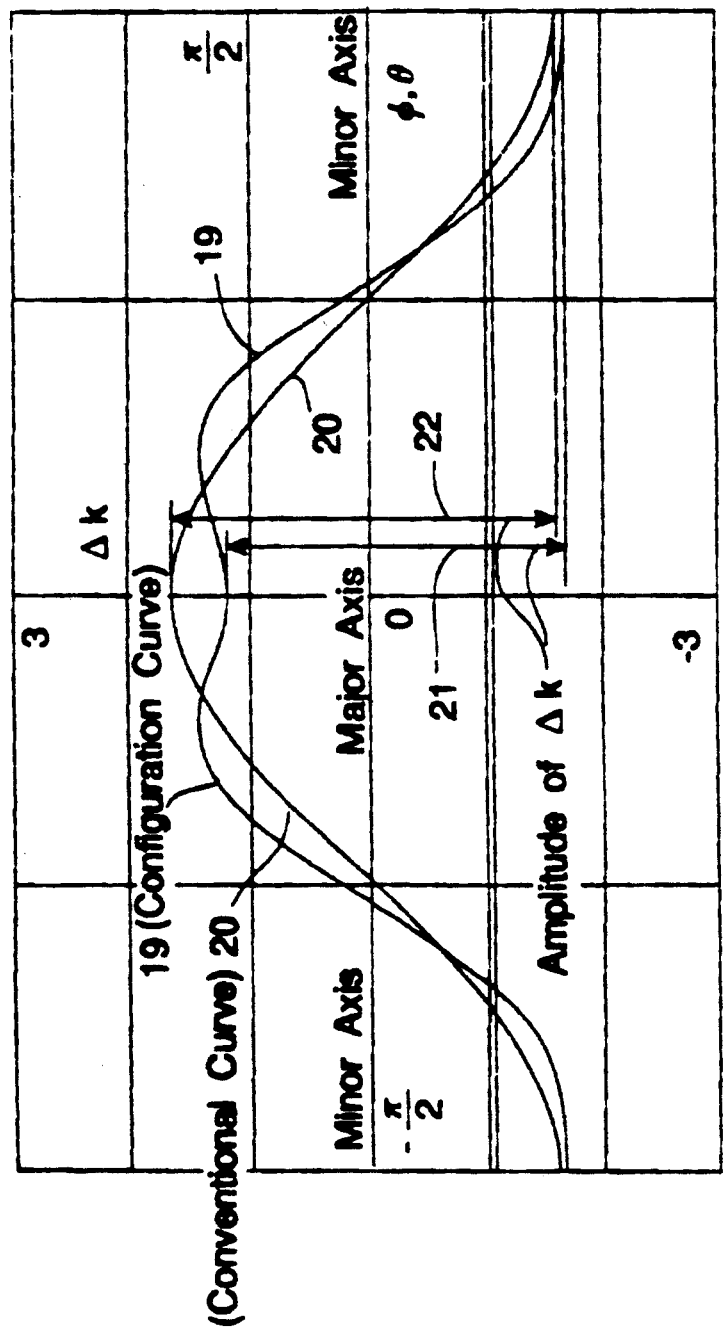
FIG. 5 is a graph comparing the curvature variation of the configuration curve according to the present invention with a conventional harmonic curve.

For examining the amplitude of $\Delta k$, curve 19 in FIG. 5 was plotted based on the same values as above to show the value of $\Delta k$ of the configuration curve according to this invention as a function of $\phi$. Also included in this figure for comparison is the corresponding curve 20 for the conventional curve (harmonic curve). (It should be noted however that the curve 20 is plotted as a function of $\theta$.) As is clear from this figure, the amplitude of $\Delta k$, which is proportional to the amplitude of the tooth rim bending stress of the flexible external gear, is smaller in the case of the configuration curve according to the invention than in the case of the conventional harmonic curve, particularly, along the major axis where the effect on strength is greatest, as can be seen by comparing height 21 for the invention with height 22 for the conventional harmonic curve.

Figure 6:
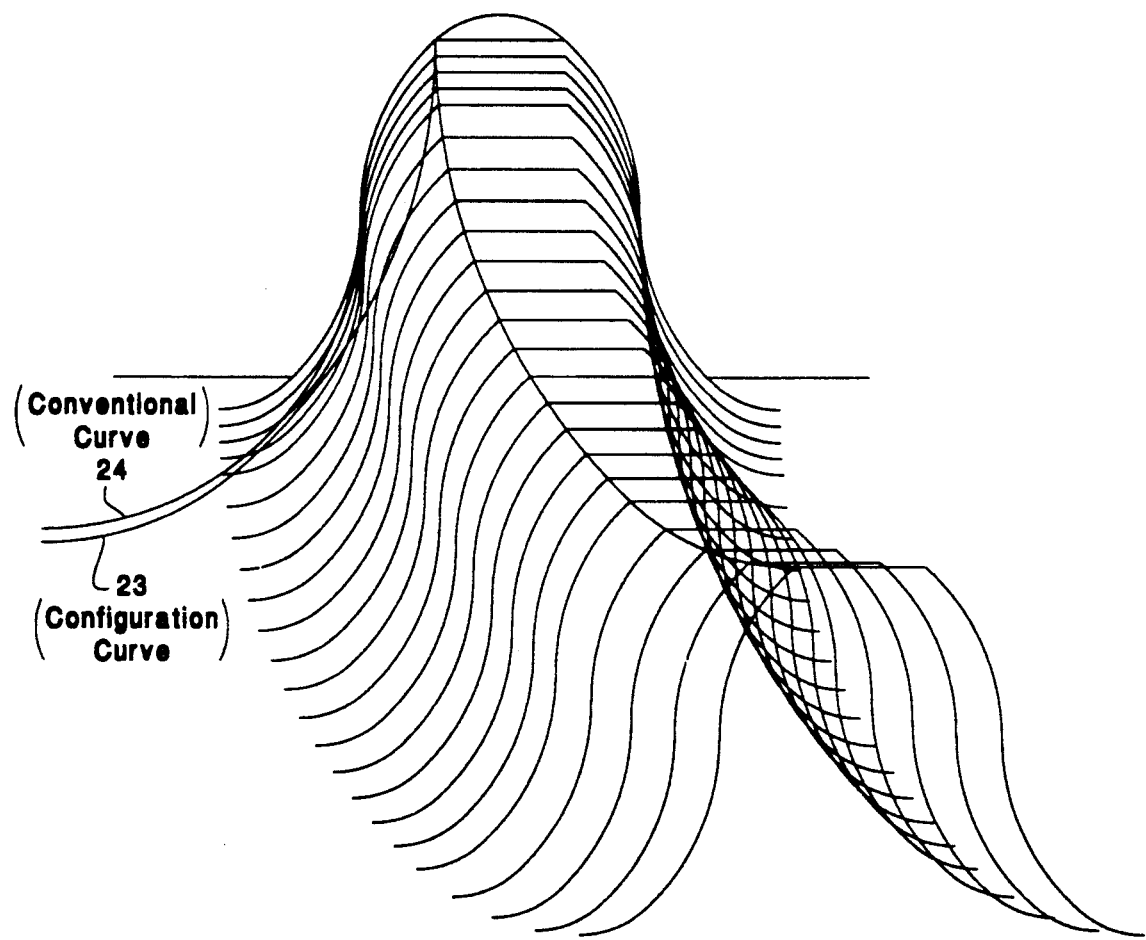
FIG. 6 is a graph showing the relative meshing between the teeth of a flexible external gear having the shape of the wave generator according to the invention and the teeth of a rigid internal gear.

In FIG. 6 the relative meshing of the two sets of teeth in the case where the teeth of the flexible external gear flexed by the wave generator of this invention mesh with the teeth of the rigid internal gear is shown in terms of the configuration curve obtained using the same values as in the earlier example. Curve 23 indicates the locus of an addendum tip in the case of the invention, while curve 24 indicates that in the case of the conventional elliptical curve (harmonic curve). The size of the meshing entry gap is clearly larger in the case of the invention.

As will be understood from the foregoing description, in the wave gear drive according to the present invention the configuration curve of the wave generator is defined by a tangential polar coordinate equation having at least four Fourier expansion terms. By appropriately selecting the coefficients in the equation, the amount of flexing of the flexible external gear can be maintained at a prescribed magnitude while simultaneously reducing the magnitude of the tooth rim bending stress of the external gear, and the meshing entry gap of the teeth can be enlarged, thus eliminating the danger of tooth interference.

I claim:

1. A wave gear drive, comprising:
   a rigid internal gear,
   a flexible external gear located inside the internal gear, and
   a wave generator located inside the external gear, said wave generator having an exterior configuration for flexing the external gear by rotation of the wave generator thereby providing relative rotation between the internal gear and the external gear,
   the exterior configuration of the wave generator is formed to a shape being defined by a tangential polar coordinate equation having at least four Fourier expansion terms, $$P = r_0 + a_1.\cos(2\phi) + a_2.\cos(4\phi) + a_3.\cos(6\phi),$$

where P is the length of the perpendicular to the tangent at the point of the shape, $\phi$ is the angle of the tangent to the reference axis, and $a_1$, $a_2$, and $a_3$ are the coefficients of the Fourier expansion.

* * * * *